United States Patent
Kamiya

(10) Patent No.: US 10,291,856 B2
(45) Date of Patent: May 14, 2019

(54) IMAGE CAPTURING APPARATUS HAVING SELF-IMAGE DISPLAY MODE, AND CONTROL THEREFOR

(71) Applicant: CANON KABUSHIKI KAISHA, Tokyo (JP)

(72) Inventor: Jun Kamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/877,276

(22) Filed: Jan. 22, 2018

(65) Prior Publication Data

US 2018/0220076 A1    Aug. 2, 2018

(30) Foreign Application Priority Data

Jan. 30, 2017    (JP) ................. 2017-014852

(51) Int. Cl.
*H04N 5/225* (2006.01)
*H04N 5/232* (2006.01)

(52) U.S. Cl.
CPC . *H04N 5/232935* (2018.08); *H04N 5/225251* (2018.08); *H04N 5/23209* (2013.01); *H04N 5/23245* (2013.01); *H04N 5/23296* (2013.01); *H04N 5/2252* (2013.01); *H04N 5/23216* (2013.01)

(58) Field of Classification Search
CPC ......... H04N 5/225251; H04N 5/23209; H04N 5/23245; H04N 5/23293; H04N 5/232935
USPC .................................................... 348/333.06
See application file for complete search history.

(56) References Cited

U.S. PATENT DOCUMENTS

| | | | | |
|---|---|---|---|---|
| 6,937,280 B2* | 8/2005 | Kawai | ..................... | G06F 1/162 348/333.01 |
| 8,811,813 B2* | 8/2014 | Takahashi | ............ | H04N 5/2252 348/333.06 |
| 2012/0081593 A1* | 4/2012 | Nakagawa | ............. | G03B 13/04 348/333.06 |
| 2012/0113308 A1* | 5/2012 | Ishikawa | .............. | H04N 5/2251 348/333.06 |
| 2013/0250158 A1* | 9/2013 | Yamauchi | .......... | H04N 5/23293 348/333.06 |
| 2014/0347542 A1* | 11/2014 | Ichikawa | ........... | H04N 5/23293 348/333.02 |
| 2015/0085157 A1* | 3/2015 | Yamaguchi | .......... | H04N 5/2252 348/223.1 |
| 2016/0360107 A1* | 12/2016 | Nabeshima | ........ | H04N 5/23241 |
| 2017/0019597 A1* | 1/2017 | Oyama | .............. | H04N 5/23245 |

FOREIGN PATENT DOCUMENTS

JP    2013-117650 A    6/2013

\* cited by examiner

*Primary Examiner* — Daniel M Pasiewicz
(74) *Attorney, Agent, or Firm* — Canon USA Inc., IP Division

(57) ABSTRACT

An image capturing apparatus includes an image capturing unit to capture an image of a subject via an optical system, and a display unit having a display surface configured to display the image, and being rotatably supported with respect to the image capturing unit. In an exemplary embodiment, an open and close angle of a display panel and a rotation angle threshold to be used when the display unit is changed to "a self-image capturing display" according to an image capturing field angle are changed, thereby switching an orientation of the image in the display in consideration of not only an orientation of the display panel but also an image capturing field angle.

16 Claims, 9 Drawing Sheets

FIG. 6

| STATE OF DISPLAY PANEL | NON-DISPLAY | 180-DEGREE ROTATED DISPLAY | NORMAL DISPLAY | SELF-IMAGE CAPTURING DISPLAY |
|---|---|---|---|---|
| ROTATION ANGLE $\phi$ | $\phi_a$ DEGREES OR LESS | $\phi_a$ DEGREES OR LESS | MORE THAN $\phi_a$ DEGREES | MORE THAN $\phi_a$ DEGREES |
| OPEN AND CLOSE ANGLE $\theta$ | LESS THAN $\theta_a$ DEGREES | MORE THAN $\theta_a$ DEGREES | BETWEEN 0 AND $\theta_b$ DEGREES | MORE THAN $\theta_b$ DEGREES |

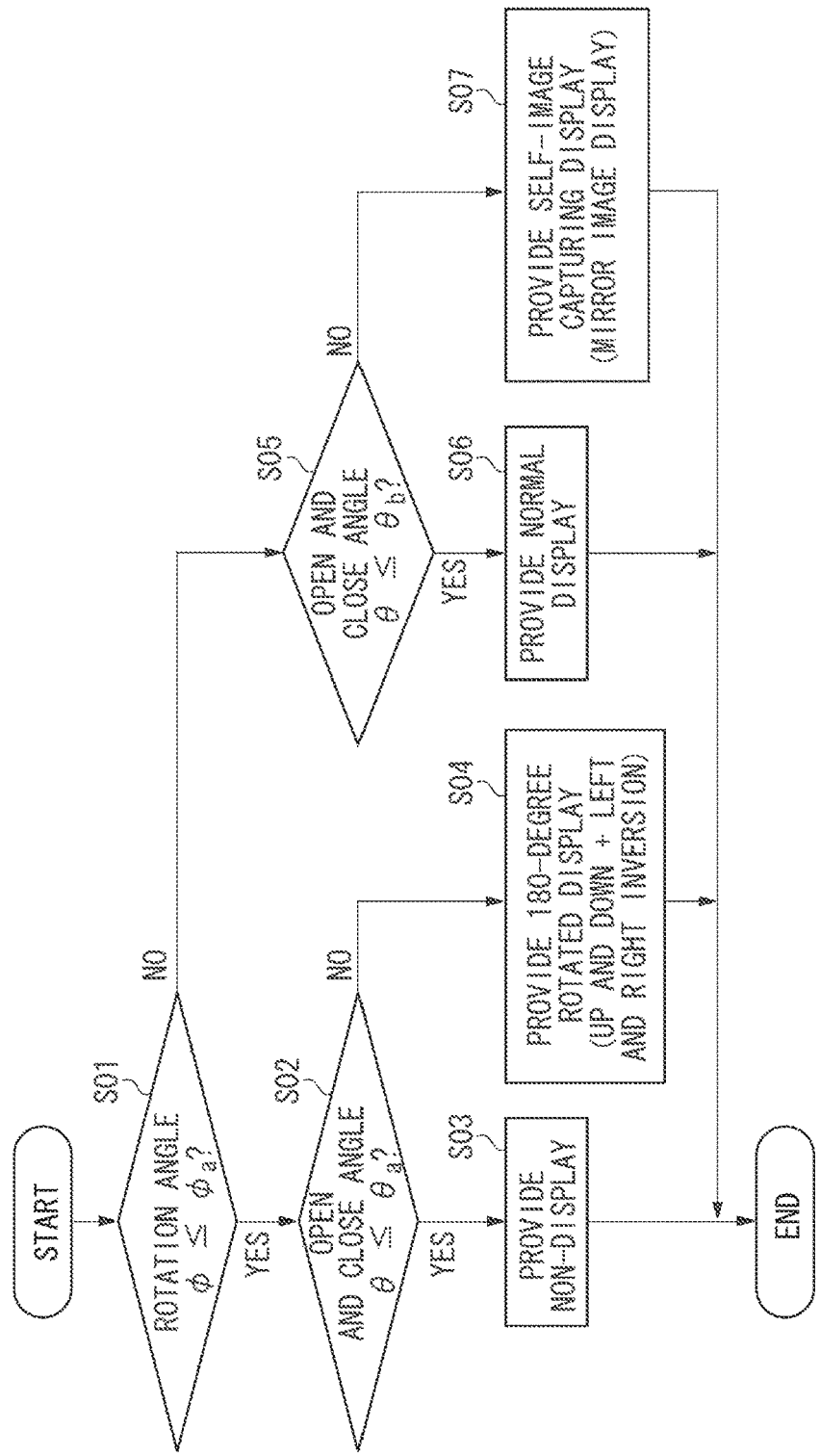

IMAGE CAPTURING APPARATUS HAVING SELF-IMAGE DISPLAY MODE, AND CONTROL THEREFOR

BACKGROUND

Field of Invention

The present disclosure relates to an image capturing apparatus, and more particularly, to an image capturing apparatus including a movable display unit with self-image display mode.

Description of Related Art

Conventionally, an image capturing apparatus such as a video camera including a display unit that can be opened, closed, and rotated with respect to a device main body is known. In such an image capturing apparatus, an image to be displayed on the display unit is inversed in an up and down direction and a left and right direction or switching between light-on and light-off of the image is performed according to an open, closed, or rotation state of the display unit.

For example, if the display unit is oriented toward the front (a subject side) of the image capturing apparatus, the display unit provides a mirror image output. That is, the display unit is in a self-image capturing state. In such a state, a photographer can capture an image while checking, for example, how an image of him/herself is to be captured, just as if he/she checks him/herself in a mirror.

Japanese Patent Application Laid-open No. 2013-117650 discusses a configuration for setting a focus position and a mode to those suitable for self-image capturing if arrangement of a display unit in a predetermined direction for self-image capturing by a photographer is detected. According to the configuration, a zoom function is automatically set to a wide-angle end, and a state is controlled to a zoom state suitable for the self-image capturing.

However, in the conventional technique discussed in Japanese Patent Application Laid-Open No. 2013-117650, if the display unit is precisely oriented toward the front (a subject side), control is performed based on consideration in which only a state in which a lens field angle is set to the widest angle is suitable for the self-image capturing.

Meanwhile, as for a composition of self-image capturing, there is a widely known image capturing method in these days. According to the image capturing method, an image is captured in such a manner that a photographer looks self-image is captured. As for a field angle, the widest angle is not always an appropriate field angle for self-image capturing in consideration of distortion aberration or wide-angle distortion of a lens. Accordingly, determination of whether self-image capturing or normal image capturing is performed based on only whether a display unit is oriented toward the front may degrade usability at image capturing. For example, a display for normal image capturing may be provided when a photographer intends to capture a self-image, or a mirror image display may be provided when a photographer captures a normal image. Moreover, in a lens interchangeable camera, a telephoto lens that is unlikely to be used for self-image capturing from a shortest image capturing distance may be attached. In such a case, if control is performed to constantly prioritize a degree of freedom of self-image capturing, there is a possibility that a self-image capturing setting may be provided although normal image capturing other than the self-image capturing is intended to be performed.

SUMMARY

The present disclosure is directed to an image capturing apparatus that can enhance usability and a degree of freedom of a composition at image capturing by changing a display direction based on an image capturing field angle and a rotation angle.

According to at least one embodiment, an image capturing apparatus includes an image capturing unit configured to capture an image of a subject via an optical system, a display unit including a display surface configured to display the image, and rotatably supported with respect to the image capturing unit, a detection unit configured to detect a rotation angle of the display unit, an acquisition unit configured to acquire field angle information of the optical system, and a display control unit configured to change a display direction of the image to display the image on the display surface based on a combination of the rotation information acquired by the acquisition unit.

Further features and advantages will become apparent from the following description of exemplary embodiments with reference to the attached drawings.

BRIEF DESCRIPTION OF THE DRAWINGS

FIG. 6 is a tabular diagram illustrating an example of a relation between the rotation state and the display state of the display unit according to the exemplary embodiment.

FIG. 7 is a flowchart illustrating a display-switching process according to the exemplary embodiment.

DESCRIPTION OF THE EMBODIMENTS

Figure 1A:
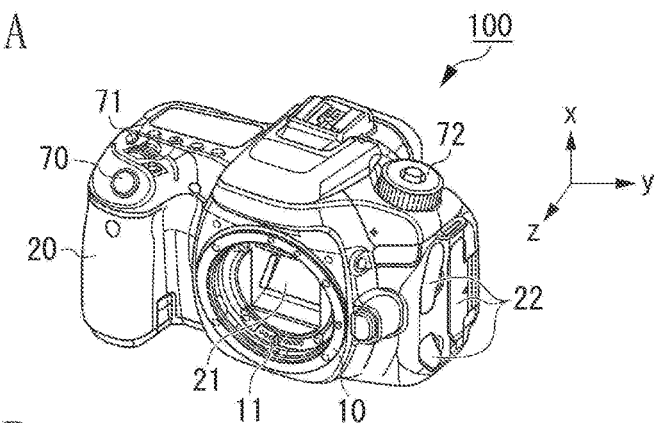
FIGS. 1A, 1B, and 1C are perspective views each illustrating an example of an overall configuration of an image capturing apparatus according to an exemplary embodiment.
Figure 1B:
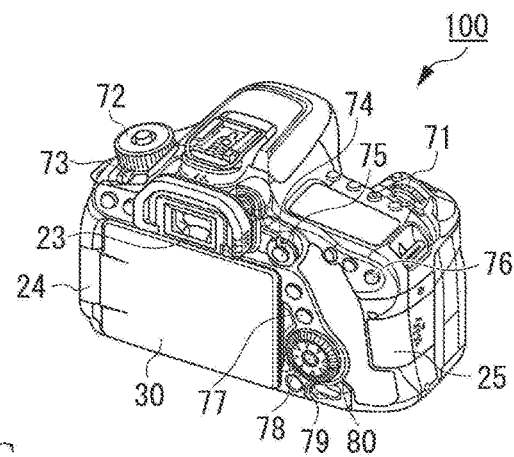
Figure 1C:
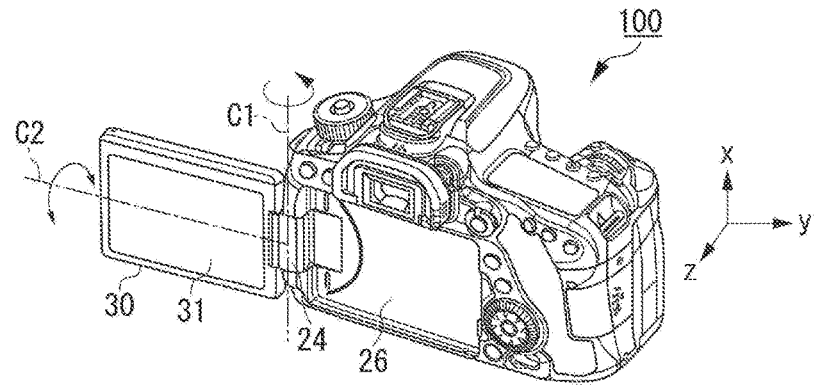

Hereinafter, one example of an exemplary embodiment is described in detail with reference to the drawings. The exemplary embodiment is described using a digital camera that is an image capturing apparatus as an example of an electronic device. However, the exemplary embodiment is not limited thereto. FIGS. 1A, 1B, and 1C are perspective views (in x, y, z space) each illustrating an example of an overall configuration of an image capturing apparatus 100 according to the exemplary embodiment. FIG. 1A is a perspective view of the image capturing apparatus 100 as seen from a front side (a subject side), and FIG. 1B is a perspective view of the image capturing apparatus 100 illustrated in FIG. 1A as seen from a back side (image side). FIG. 1C is a perspective view illustrating an example of a state in which a display unit 30 of the image capturing apparatus 100 illustrated in FIG. 1B is opened. The image capturing apparatus 100 according to the present exemplary embodiment includes a detachable lens unit on the front side, and the display unit 30 on the back side. The display unit 30 can be opened, closed, and rotated with respect to the image capturing apparatus 100.

In FIG. 1A, the image capturing apparatus 100 includes a mount unit 10 on the front side thereof, and an interchangeable lens unit (an optical system) (not illustrated) is attached to be communicable with the image capturing apparatus 100 via the mount unit 10. In a state in which the lens unit (the optical system) is attached, an image capturing element (not illustrated) inside the image capturing apparatus 100 captures light that has entered from the lens unit not only to generate image data of a subject, but also to record and display the image data. A quick-return mirror 21 and a communication terminal 11 are arranged inside the mount unit 10. Behind the quick-return mirror 21, an image capturing element (not illustrated) is arranged along an optical axis.

The communication terminal 11 corresponds to one example of a communication unit according to the exemplary embodiment. The image capturing apparatus 100 and the lens unit can communicate with each other via the communication terminal 11 to exchange information such as lens type information and lens setting information (e.g., a zoom state, and on/off of a camera shake correction function).

A grip unit 20 is arranged on the left side of the mount unit 10 as viewed from the front side of the image capturing apparatus 100. A release button 70 is arranged above the grip unit 20. An image capturing (recording) instruction can be issued if the release button 70 is pressed.

Moreover, a terminal cover 22 is arranged on a side portion on the right side as viewed from the front side of the image capturing apparatus 100. The terminal cover 22 can be opened and closed for accessing electrical connections of the image capturing apparatus 100.

In FIG. 1B, a mode dial 72, a main electronic dial 71, and a power button 73 are arranged on an upper surface portion of the image capturing apparatus 100, The dials and the buttons are used when a user issues instructions such as an image capturing (recording) instruction, a playback instruction, and a setting instruction to the image capturing apparatus 100. For example, a live view (LV) lever 74 switches a mode between a still image capturing mode and a moving image capturing mode. An LV button 75 is used to switch on and off a live view in the still image capturing mode. Moreover, the LV button 75 is used to issue an instruction to start or stop image capturing (recording) in the moving image capturing mode.

Moreover, an eyepiece finder 23 is arranged in a backside portion of the image capturing apparatus 100.

As illustrated in FIGS. 1B and 1C, the display unit 30 including a display panel 31 (a display surface) such as a liquid crystal display (LCD) is arranged in the backside portion of the image capturing apparatus 100. The display unit 30 is rotatably supported by a hinge unit 24. In this manner, the display unit 30 can be rotated in an open/close direction via a rotation axis C1 of the hinge unit 24 with respect to the image capturing apparatus 100. The rotation axis C1 is substantially parallel to a vertical direction (x-axis direction) of the image capturing apparatus 100 (an image capturing element (not illustrated)), and is substantially perpendicular to an optical axis thereof (z-axis).

In addition, the display unit 30 is configured to be rotated via a rotation axis C2 of the hinge unit 24 with respect to the image capturing apparatus 100, as illustrated in FIG. 1C. Specifically, in an open state illustrated in FIG. 1C, the display unit 30 rotates about the rotation axis C2 which is perpendicular to the rotation axis C1 and substantially parallel to a horizontal direction of the image capturing apparatus 100. That is, the rotation axis C2 is perpendicular to the vertical direction (x-axis direction) of the image capturing apparatus 100, and the display unit 30 rotates about the rotation axis C2 with respect to the image capturing apparatus 100.

Next, a movable range of the display unit 30 with respect to the image capturing apparatus 100 will be described, with reference to FIGS. 2A and 2B that are diagrams each illustrating an example of the movable range of the display unit 30 according to the exemplary embodiment.

Figure 2A:
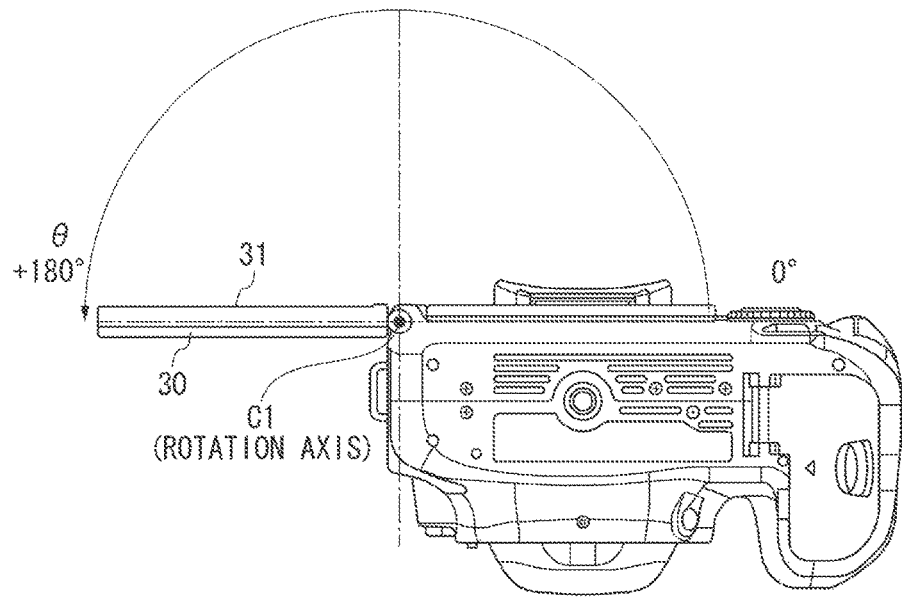
FIGS. 2A and 2B are diagrams each illustrating an example of a movable range of a display unit according to the exemplary embodiment.

FIG. 2A is a diagram illustrating the image capturing apparatus 100 as seen from the bottom thereof (in the x-axis direction). As illustrated in FIG. 2A, the from a rotation angle of 0 degrees (a closed position) to an approximately 180 degrees (a fully opened position). An open and close angle herein, an angle of rotation with respect to the rotation axis C1, is defined as θ. In FIG. 2A, it should be understood that the display unit 30 is not only opened but can also be closed with respect to the image capturing apparatus 100.

Figure 2B:
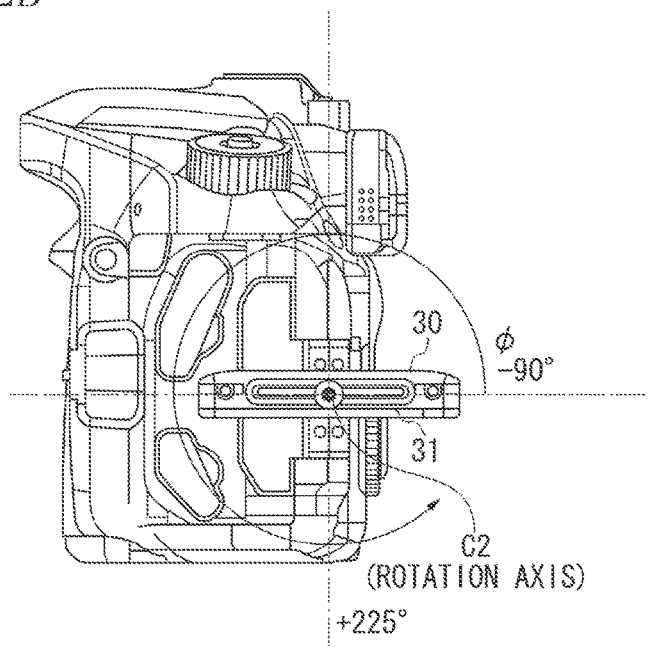

FIG. 2B is a side view (seen along the y-axis direction) illustrating a state in which the display unit 30 is rotated by a rotation angle of −90 degrees about the rotation axis C2 with the display unit 30 being opened at a rotation angle of 180 degrees about the rotation axis C1. As illustrated, in FIG. 2B, the display unit 30 can be rotated up to approximately +225 degrees from a rotation angle of approximately −90 degrees (90 degrees in a frontward direction) about the rotation axis C2. An angle of rotation with respect to the rotation axis C2, herein is defined as φ.

Figure 3A:
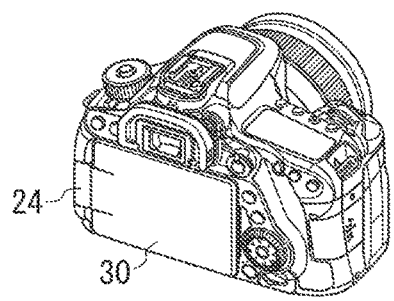
FIGS. 3A, 3B, 3C, and 3D are perspective views each illustrating an example of a rotation state of the display unit according to the exemplary embodiment.

Next, a display state of a display panel 31 (a display surface) in each state in a case where the display unit 30 is operated will be described with reference to FIGS. 3A through 4. FIGS. 3A through 3D are perspective views each illustrating an example of a rotation state of the display unit 30 according to the exemplary embodiment. FIG. 4 is a diagram illustrating an example of a display state of the display unit. 30 of the exemplary embodiment.

In a state illustrated in FIG. 3A, the display unit 30 is stored such that the display panel 31 (the display surface) is facing the storage surface 26 illustrated in FIG. 1C (an open and close angle θ is 0 degrees, and a rotation angle φ is 0 degrees). In this state, a photographer cannot see a display state of the display panel 31 (the display surface), and the display panel 31 is controlled by a system control unit 50 (described below) so as to be in a non-display state (display off).

Figure 3B:
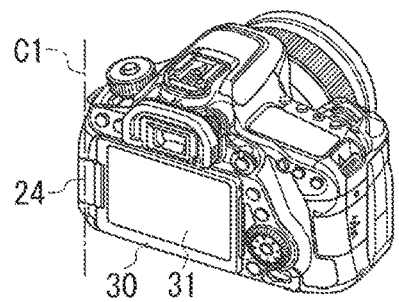
Figure 4:
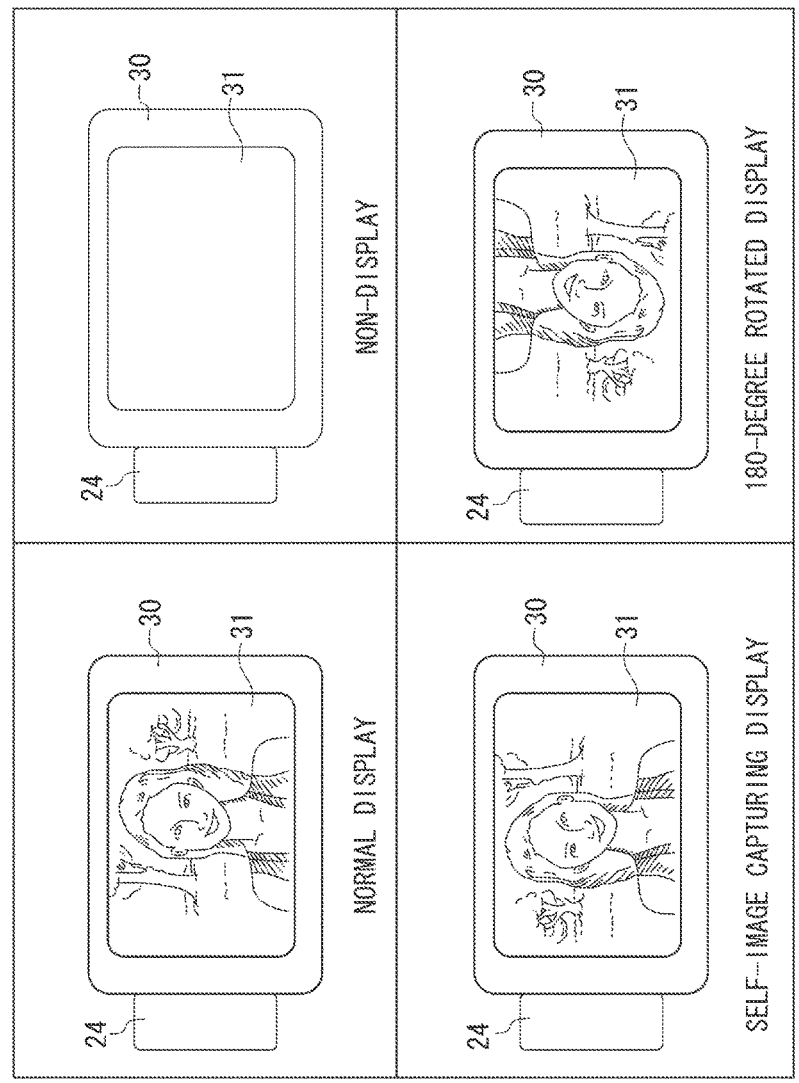
FIG. 4 is a diagram illustrating an example of a display state of the display unit according to the exemplary embodiment.
Figure 5:
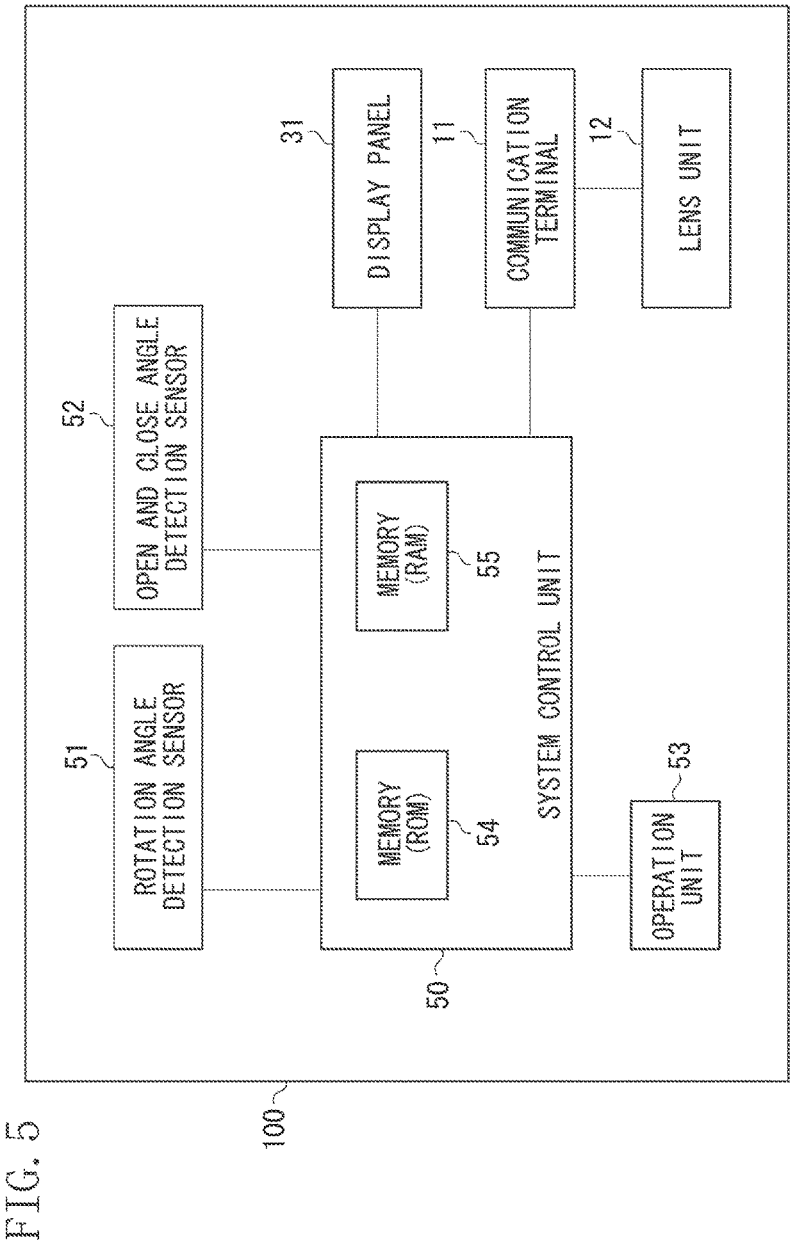
FIG. 5 is a block diagram illustrating a configuration example of the image capturing apparatus according to the exemplary embodiment.

In a state illustrated in FIG. 3B, the display unit 30 is stored in the storage surface 26 such that the photographer can see the display panel 31 (an open and close angle θ is 0 degrees, and a rotation angle φ is 180 degrees). This state is similar to a display state of an image capturing apparatus having a non-rotatable display unit. Hereinafter, a display state of the display panel 31 (the display surface) in such a state is referred to as a "normal display". In this case, the display panel 31 (the display surface) is controlled by the system control unit 50 so as to be in a display state of "normal display" illustrated in FIG. 4.

Figure 3C:
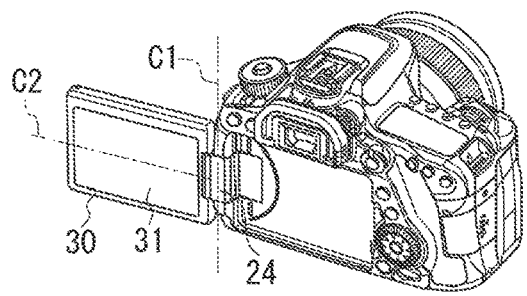

In a state illustrated in FIG. 3C, the display unit 30 is fully opened about the rotation axis C1, and the display panel 31 (the display surface) is facing the photographer (an open and close angle θ is 180 degrees, and a rotation angle φ is 0 degrees).

A display of the display panel 31 (the display surface) in this state is controlled by the system control unit 50 such that a normal display is rotated by 180 degrees within a screen (a display with up and down inversion+left and right inversion is shown). Hereinafter, a display state of the display panel 31 (the display surface) in this state is referred to as a "180-degree rotated display". In FIG. 4, an example of the display panel 31 (the display surface) rotated by 180 degrees is illustrated as "180-degree rotated display" on the bottom right-side of FIG. 4.

The display unit 30 can be rotated about the rotation axis C2 from the state illustrated in FIG. 3C such that the display panel 31 (the display surface) is oriented upward or downward. This enables an image to be captured from various orientations including a high angle and a low angle.

Figure 3D:
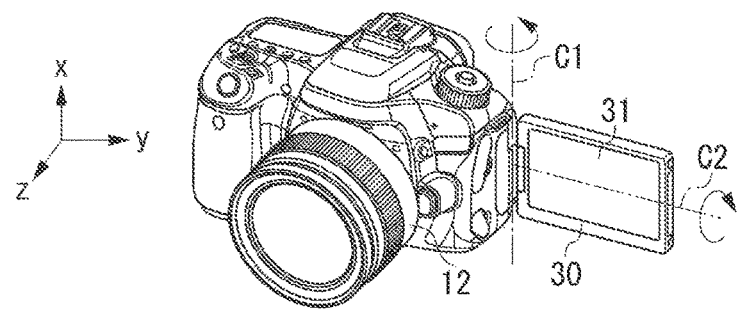

In a state illustrated in FIG. 3D, the display unit 30 is fully opened about the rotation axis C1, and the display panel 31 (the display surface) is rotated about the rotation axis C2 to face a subject side (an open and close angle θ is 180 degrees, a rotation angle φ is 180 degrees). A display of the display panel 31 (the display surface) in this state is controlled by the system control unit 50, so that a display in which a normal display is inverted in a left and right direction is provided (i.e., a mirror image display is provided). That is, a display of the display panel 31 becomes suitable for a photographer to perform self-image capturing. Hereinafter, a display state of the display panel 31 (the display surface) in this state is referred to as a self-image capturing display (a mirror image display). In FIG. 4, an example of the display panel 31 displayed for self-image capturing is illustrated as "self-mage capturing display" on the lower left-side thereof.

Therefore, a display state of the display panel 31 (the display surface) is switched according to an operation of the display unit 30, so that a photographer can perform image capturing with a higher degree of freedom while checking the display panel 31.

The exemplary embodiment of a hardware configuration and operations thereof is described with reference to FIGS. 5 through 9, FIG. 5 is a block diagram illustrating a hardware configuration example of the image capturing apparatus 100 according to the exemplary embodiment.

The system control unit 50 comprehensively controls the image capturing apparatus 100 to control an image display and an operation. The system control unit 50 (a computer or controller) includes a central, processing unit (CPU), a memory (a read only memory (ROM)) 54, and another memory (a random access memory (RAM)) 55, The CPU controls each functional block of the image capturing apparatus 100, and makes a calculation necessary for such control according to a computer program, loaded from the memory (ROM) 54. The memory (ROM) 54 stores a control computer program to be executed by the CPU, and various constant, values necessary for execution of the computer program. The memory (RAM) 55 is an area for storing various pieces of temporary data necessary for execution of the computer program.

A rotation angle detection sensor 51 detects a rotation angle φ about the rotation axis C2. An open and close angle detection sensor 52 detects an open and close angle θ about the rotation axis C1. Each of the rotation angle detection sensor 51 and the open and close angle detection sensor 52 is one example of a detection unit according to the exemplary embodiment.

As for each of the rotation angle detection sensor 51 and the open and close angle detection sensor 52, for example, a photo interrupter (PI) using light for detection can be used, or a Hall element using magnetic force for detection can be used. Moreover, a single sensor may be used, or a combination of plurality of sensors may be used for detecting both the rotation angle φ and the open and close angle θ.

In the present exemplary embodiment, a linear Hall integrated circuit (IC) as one example of the detection sensor is used for each of the rotation angle detection sensor 51 and the open and close angle detection sensor 52. The linear Hall IC changes a voltage to be output according to a strength of magnetic force to be applied. The linear Hall IC is arranged such that magnetic force to be applied changes according to a rotation angle of the display unit 30, and such arrangement enables the angle to be calculated.

An operation unit 53 includes the release button 70 and the main electronic dial 71 of the image capturing apparatus 100, and receives an operation from a user.

Next, how four types of display states and display directions of the display panel 31 (the display surface) illustrated in FIG. 4 are switched will be described in detail with reference to FIGS. 6 and 7.

As illustrated in FIG. 6, a display state and a display direction of the display panel 31 are switched based on combined conditions of a rotation angle φ and an open and close angle θ. Specifically, in the present exemplary embodiment, one angle threshold φa is provided as a condition for the rotation angle φ, and two angle thresholds θa and θb are provided as conditions for the open and close angle θ to perform display control.

For example, the display unit 30 may be closed about the rotation axis C1 from the state illustrated in FIG. 3C to the state illustrated in FIG. 3A. In such transition, the threshold θa is an open and close angle to be used in a case where the display panel 31 (the display surface) is switched to a non-display state.

For example, the display unit 30 may be opened about the rotation axis C1 from the state illustrated in FIG. 3B to the state illustrated in FIG. 3D. In such transition, the threshold θb is an open and close angle to be used in a case where display panel 31 (the display surface) is switched, to a self-mage capturing display (a mirror image display).

For example, the display unit 30 may be rotated about the rotation axis C2 toward a subject from the state illustrated in FIG. 3C to the state illustrated in FIG. 3D. In such transition, the threshold φa is a rotation angle to be used in a case where the display panel 31 (the display surface) is switched to a self-mage capturing display (a mirror image display).

Hereinafter, display switching processing according to the exemplary embodiment will be described with reference to a flowchart illustrated in FIG. 7, The flowchart in FIG. 7 illustrates a procedure (computer program) that is executed by the system control unit 50 by controlling each process block. The computer program and table of FIG. 6 stored in the memory (ROM) 54 of the system control unit 50 are loaded to the memory (RAM) 55, and then the CPU executes the computer program, thereby executing the procedure illustrated in FIG. 7.

In step S01, the CPU compares a rotation φ about the rotation axis C2 with a threshold φa to determine whether The rotation is the threshold φa or less That is, the CPU determines whether the display panel 31 (the display surface) is oriented toward a front side (a subject side) or a back side with the display unit 30 being opened with respect to the image capturing apparatus 100 as illustrated in FIG. 2A. For example, a threshold φa is 160 degrees. If a rotation angle φ is 160 degrees or more, the CPU determines that the display panel 31 is oriented toward a subject side as illustrated in FIG. 3D with the display unit 30 being opened with respect to the image capturing apparatus 100 as illustrated in FIG. 2A.

In other words, if the rotation angle φ is the threshold φa or less, the display panel 31 is in a state as illustrated in FIG. 3A or 3C, for example. If the rotation angle φa is the threshold φa or more, the display panel 31 is in a state as illustrated in FIG. 3B or 3D, for example. If the rotation angle φ is the threshold φa or less (YES in step S01), the processing proceeds to step S02. If the rotation angle φ is the threshold φa or more (NO in step S01), the processing proceeds to step S05.

In step S02, the CPU compares an open and close angle θ about the rotation axis C1 with a threshold θa to determine whether the open and close angle θ is the threshold θa or less. That is, if a determination result acquired in step 301 is YES, the CPU determines how far the display unit 30 is open. In other words, for example, the CPU determines to which state illustrated in FIG. 3A or 3C the state of the display unit 30 is closer. If the open and close angle θ is the threshold θa or less (YES in step S02), the processing proceeds to step S03.

When the processing proceeds to step 503 (when the rotation angle φ is equal to or less than the threshold φa, and the open and close angle θ is equal to or less than the threshold θa), for example, the display unit 30 is in a state as illustrated in FIG. 3A. That is, it is determined that the display panel 31 is oriented inward, the display surface cannot be seen by a photographer, or the display surface is not intended to be seen with the display unit 30 being closed. In such a case, the display panel 31 (the display surface) does not need to be displayed. Thus, a display state is to be "non-display".

If the open and close angle θ is the threshold θa or more (NO in step S02), that is, if the display unit 30 is being opened at an angle more than a predetermined angle, the processing proceeds to step S04. In this case, the display panel 31 is oriented toward the back side and is opened at a predetermined angle or more, for example, in a state as illustrated in FIG. 3C. Thus, it is conceivable that a subject is intended to be captured from the back side of the camera. In this case, since the display panel 31 is upside down with respect to the "normal display" state illustrated in FIG. 3B, the display panel 31 is switched to the "180-degree rotated display" state. In the "180-degree rotated display", an image is inverted in an up and down direction and a left and right, direction, and then displayed, Referring back to step S01, processing that is performed if the rotation angle φ is the threshold φa or more (NO in step S01) will be described. That is, processing that is performed in a case where the display panel 31 is oriented toward a front side (a subject side) with the display unit 30 being opened with respect, to the image capturing apparatus 100 as illustrated in FIG. 3D or in a case the display panel 31 (the display surface) is oriented outward with the display unit 30 being closed as illustrated in FIG. 3B will be described.

In this case (NO in step S01), the processing proceeds to step S0S in which the CPU compares an open and close angle θ about the rotation axis C1 with a threshold θb to determine whether the open and close angle θ is the threshold θb or less. That is, if the CPU determines that the display panel 31 is oriented toward the front side (the subject side) based on a determination result acquired in step S01, the CPU determines how far the display unit 30 is open. If the CPU determines that the open and close angle θ is the threshold θb or less (YES in step S05), the processing proceeds to step S06.

If the processing proceeds to step S06, the display panel 31 (the display surface) is oriented outward with the display unit 30 being closed, for example, the display unit 30 and the display panel 31 are in the state as illustrated in FIG. 3B. In this case, "normal display" is provided for a display direction of an image to be displayed on the display panel 31.

If the CPU determines that the open and close angle θ is the threshold θb or more (NO in step 305), the processing proceeds to step S07. In this case, the display panel 31 subject side), and the display unit 30 is opened, for example, the display unit 30 and the display panel 31 are in the state as illustrated in FIG. 3D. In this case, a display direction for the display panel 31 (the display surface) is controlled such that "self-mage capturing display" (a mirror image display provided by inverting a normal display in a left and right direction) is provided.

In a case where an angle to be a threshold is set, thresholds φa and θb at which a display is switched to the self-image capturing display may be set to narrow angles that ensure only the typical self-image capturing state illustrated in FIG. 3D. In such a case, even a small movement of the display unit 30 from the self-image capturing state illustrated in FIG. 3D switches the display. Consequently, a degree of freedom of a self-image capturing composition is degraded. Meanwhile, a degree of freedom of normal image capturing state as illustrated in FIG. 3C is enhanced. On the other hand, thresholds φa and θb at which a display is switched to the self-image capturing display may be set to wide angles from the state illustrated in FIG. 3D such that a degree of freedom of self-image capturing is enhanced. In such a case, a degree of freedom in normal image capturing is affected. Therefore, it is conceivable that there is a possibility that a display state or a display direction may be switched although switching is not necessary, or a display state or a display direction may not be switched although switching is necessary, depending on a threshold setting.

Accordingly, in the present exemplary embodiment, angle thresholds φa and θb at which the display panel 31 is switched to a self-image capturing display are changed based on image capturing field angle information of a lens, so that appropriate display control is performed. If an attached lens unit 12 is a zoom lens and an image capturing field angle (a focal length) is changeable, angle thresholds φa and θb are set again according to a zoom state. For example, a threshold of an image capturing field angle (or a focal length) may be determined beforehand. In such a case, if the image capturing field angle exceeds the threshold due to a zoom state, thresholds φa and θb are controlled to be set again. Moreover, for example, a movement of the zoom lens may cause an amount of change in the image capturing field angle to be a predetermined amount or more. In such a case, thresholds φa and θb can be set again.

Figure 8:
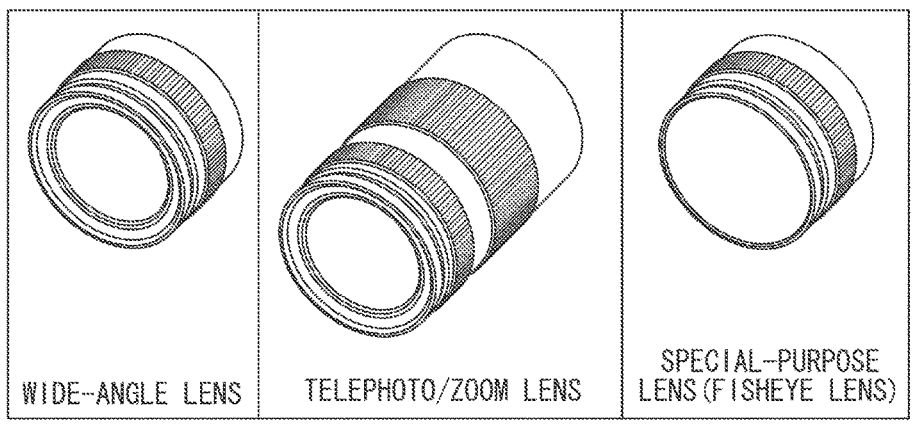
FIG. 8 is a diagram illustrating examples of interchangeable lens units according to the exemplary embodiment.

Herein, in the image capturing apparatus 100 of the present exemplary embodiment, the lens unit 12 of an interchangeable type is detachable. An example of the lens unit 12 is interchangeable lenses such as a wide-angle lens, a telephoto lens, and a zoom lens, and such an interchangeable lens is detachable. FIG. 8 illustrates one example of the interchangeable lens unit 12. An image capturing field angle λ of the camera can be calculated by Equation 1 below from a focal length of the lens unit 12 and a sensor size, except for a certain special-purpose interchangeable lens.

$$\lambda = 2 \times \operatorname{atan}(\text{sensor size}/(2 \times \text{focal length})) \quad \text{Equation 1}$$

The system control unit 50 can acquire lens information including focal length information of the attached lens unit 12 by lens communication via the communication terminal 11, and calculate an image capturing field angle.

If an image capturing field angle is narrow, i.e., if a focal length is long, self-image capturing in which an image is captured at a short distance is difficult. If self-image capturing is performed in a composition having a high degree of freedom with a camera at an angle, it is even more difficult. Consequently, such self-image capturing is less likely to be performed.

Figure 9:
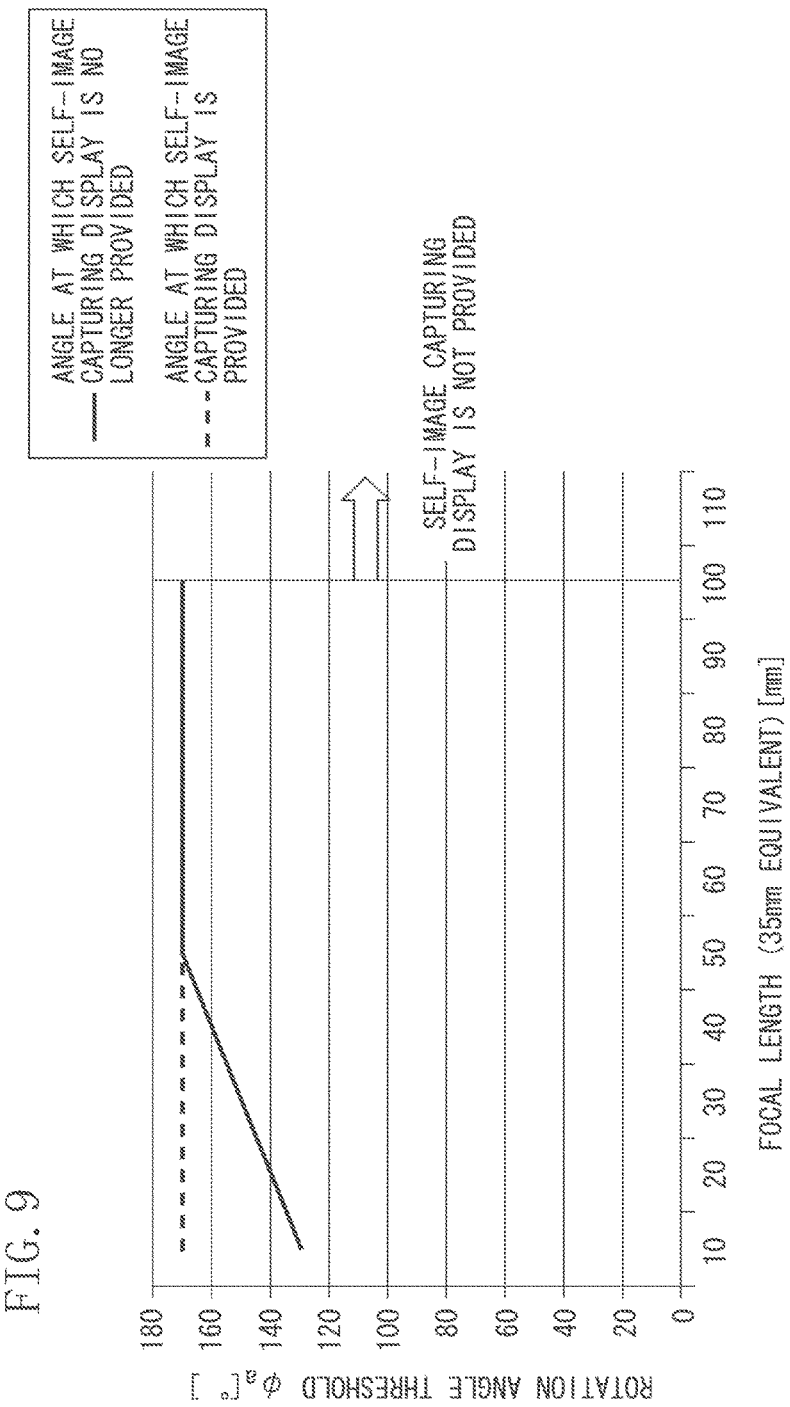
FIG. 9 is a graph illustrating an example of a relation between a lens focal length and a rotation angle threshold according to the exemplary embodiment.

FIG. 9 is a diagram illustrating one example of a setting value of a rotation angle threshold φa with respect to a lens focal length in 35 mm equivalent. In general, if self-image capturing is performed, the display unit 30 is often rotated at least once to face subject side (a rotation angle φ=180 degrees). Herein, an angle at which a display is switched to the self-image capturing display (the mirror image display) is uniformly set, and an angle at which the self-image capturing is no longer provided is set to be changed according to field angle of the imaging optical Moreover, for example, a lens having a shortest focal length of 50 mm in 35 mm equivalent may be used. In such a case, even if a photographer stretches out his/her arm to capture an image, there is a high possibility that even shoulders of the photographer may not be fitted in an image capturing field angle. Accordingly, for example, if a lens having a shortest focal length of 50 mm in 35 mm equivalent is used, only a state in which the display unit 30 is rotated to the vicinity of the subject side (a rotation angle φ=180 degrees) is an area of the self-image capturing display.

Moreover, for example, since a lens having a shortest focal length of 100 mm in 35 mm equivalent has a relatively narrow field angle, there is a high possibility that the use of such a lens may not be suitable for self-image capturing. Accordingly, for example, if a lens having a shortest focal length of 100 m in 35 mm equivalent is used, a display is set such that the self-image capturing display (the mirror image display) is not provided.

Moreover, a lens with a long focal length has a shortest image capturing distance that tends to be long. However, a display can be set such that the self-image capturing display (the mirror image display) is not provided, based on information of the shortest image capturing distance other than information of the focal length. For example, a display is set such that the self-image capturing display (the mirror image display) is not provided if a lens having a shortest image capturing distance of 0.9 m or more is used.

Alternatively, a change of a mode to a self-image capturing mode may be permitted depending on a zoom, position if a zoom lens is used, and a mode may be set such that a self-image capturing mode is not provided if a current zoom position is longer than a predetermined focal length (e.g., 100 mm in 35 mm equivalent). In the self-image capturing mode, a warning may be issued if a focal length of a lens becomes longer than a predetermined focal length (e.g., 100 mm in 35 mm equivalent). Moreover, if a focal length is shorter than a predetermined focal length (e.g., 50 mm in 35 mm equivalent), a rotation angle threshold of a display unit for switching to a self-image capturing mode is increased as the focal length is shortened.

Alternatively, a mode is set to have a tendency not to be switched to a self-image capturing mode as a focal length changes from short to long focal lengths. For example, a rotation angle threshold of a display unit to switch to a self-image capturing mode can be gradually reduced according to a slope of an increase in focal length distance, as illustrated in FIG. 9.

Although FIG. 9 is a graph illustrating a relation between a focal distance and an angle threshold for the sake of convenience by using an example of a lens the image capturing field angle of which can be calculated from a focal length, the angle threshold is consistently determined by an image capturing field angle. Accordingly, if a special-purpose lens such as a fisheye lens is used, control is performed according to an image capturing field angle, separately from Equation 1.

Moreover, since a field angle in a horizontal direction and a field angle in a vertical direction differ, vertical position image capturing: and horizontal position image capturing can be identified by an orientation detection sensor (not illustrated), and then an angle threshold can be changed. The orientation detection sensor can be any device such as an acceleration sensor (accelerometer) or a gyro sensor (gyroscope) regardless of a sensor type as long as the device is capable of detecting a change in orientation.

Although the setting of the rotation angle threshold φa has been described using the diagram illustrated in FIG. 9, an open and close angle threshold θb can be basically set in the similar manner. If rotation about the rotation axis C1 and rotation about the rotation axis C2 image capturing apparatus 100, each angle threshold can be set in consideration of such differences.

Moreover, when the "self-image capturing display" is provided, an image capturing mode or image processing can be changed to that suitable for self-image capturing in addition to a switch of the display. In such a case, since a conventional technique is used, a detailed description is omitted. For example, resolution of a face area is decreased to slightly blur the face area, and conversion is performed to reduce color unevenness. Thereby, an image capturing parameter, a setting, and a display are changed to those suitable for the self-image capturing. Moreover, for example, a control operation is executed. Examples of the control include an automatic focus (AF) control for a focused area, an exposure control suitable for a face area, and control by which actual image capturing is delayed relative to an image capturing instruction to prevent image shake caused by the press of an image capturing button.

Accordingly, angle thresholds φa and θb are changed according to an image capturing field angle. This enables a degree of freedom of a self-image capturing composition to be enhanced in a case in which self-image capturing is highly likely to be performed, and prevents a case in which a degree of freedom of image capturing other than the self-image capturing is damaged.

Accordingly, the procedure for switching a display of the display panel 31 has been described. The angles to serve as thresholds such as the above-described thresholds (φa, θa, and θb can be optionally set by changing a threshold for voltage to be output from the linear Hall IC. Moreover, an angle at which a display state of the display panel 31 is switched to a self-image capturing mode and an angle at which a display state returns to the original display state can be set to different thresholds. For example, if a display is once switched, the display state can be arranged to have a tendency not to return to the original display state prior to the change of the display. This can prevent frequent switches of the display.

The present disclosure has been described with reference exemplary embodiment, but is not limited thereto. It should be understood that various modifications and changes are possible without departing from the scope of the novel concepts described herein. Accordingly, a scope of the technical concepts described herein should not be limited to the above-described exemplary embodiments, and should be appropriately changed according to a circuit format to be targeted. For example, the above exemplary embodiment has been described using a camera as an image capturing apparatus. However, the above-described exemplary embodiment can be employed for a digital still camera and a digital video camera.

Moreover, the exemplary embodiment can be employed for, for example, a system, an apparatus, a method, a computer program, or a non-transitory recording medium. In particular, the exemplary embodiment can be employed for a system including one apparatus or a system including a plurality of apparatuses. Each unit of the image capturing apparatus and each step of a control method for the image capturing apparatus according to the exemplary embodiment can function by operation of a program stored in a memory of a computer. An aspect of the present disclosure includes a computer program and a computer readable recording medium in which the computer program is stored.

Aspects of the present disclosure can be achieved by a system or apparatus to which a program for performing one or more functions of the above exemplary embodiment is supplied via a network or a recording medium. In such a case, one or more processors in a computer of the system or apparatus read and execute the program. Moreover, aspects of the present disclosure can be achieved by a circuit (e.g., an application specific integrated circuit (ASIC)) for performing one or more functions.

According to the exemplary embodiment, therefore, changes in a display direction based on an image capturing field angle and a rotation angle can enhance a degree of freedom of image composition, and improve usability of the image capturing apparatus at the time of image capturing.

While the present disclosure has been described with reference to exemplary embodiments, it is to be understood that the inventive concepts described herein are not limited to the disclosed exemplary embodiments alone. The scope of the following claims is to be accorded the broadest interpretation so as to encompass all modifications and equivalent structures and functions.

This application claims foreign priority benefit of Japanese Patent Application No. 2017-014852, filed Jan. 30, 2017, which is hereby incorporated by reference herein in its entirety.

What is claimed is:

1. An image capturing apparatus comprising:
an image capturing unit configured to capture an image of a subject via an optical system;
a display unit including a display surface configured to display the image, and rotatably supported with respect to the image capturing unit;
an acquisition unit configured to acquire field angle information of the optical system; and
a display control unit configured to, if a field angle based on the field angle information is wider than a predetermined angle, change a display direction of the image to display the image on the display surface in a case where the display surface is rotated and oriented toward the subject.

2. The image capturing apparatus according to claim 1, wherein if the field angle based on the field angle information is narrower than the predetermined angle, the display control unit does not change the display direction of the image in a case where the display surface is rotated and oriented toward the subject.

3. The image capturing apparatus according to claim 1, wherein, if the display surface is oriented toward the subject, the display control unit inverts the image in at least one of a left and right direction and an up and down direction to display the image on the display surface.

4. The image capturing apparatus according to claim 1, wherein the display unit is rotatable about a first rotation axis substantially parallel to a horizontal direction of the image capturing unit, and
wherein the display control unit inverts the image in at least one of a left and right direction and an up and down direction to display the image on the display surface based on the field angle and a rotation angle about the first rotation axis.

5. The image capturing apparatus according to claim 1, wherein, if the field angle is wide, the display control changed more easily than if the field angle is narrow. unit allows a display direction of the display surface to be changed more easily than if the field angle is narrow.

6. The image capturing apparatus according to claim 1, wherein, in a case where a display direction of the image is changed, the display control unit changes a threshold for changing the display direction such that a display direction does not tend, to return to the display direction prior to the change.

7. The image capturing apparatus according to claim 1, wherein, if the field angle exceeds a predetermined threshold or a change in the field angle is larger than a predetermined change, the display control unit changes a threshold for changing a display direction of the display surface.

8. The image capturing apparatus according to claim 1, wherein the image capturing unit is configured to be attached to and detached from an interchangeable lens.

9. The image capturing apparatus according to claim 4, wherein the display unit is rotatable about a second rotation axis parallel to a vertical direction of the image capturing unit, and
wherein the display control unit is capable of setting a threshold for switching a display direction for each of the first rotation axis and the second rotation axis.

10. The image capturing apparatus according to claim 1, wherein the field angle information to be acquired by the acquisition unit includes field angle information corresponding to a shortest focal length of an optical system attached to the image capturing apparatus.

11. The image capturing apparatus according to claim 1, wherein the field angle information to be acquired by the acquisition unit includes field angle information corresponding to a focal length at a time of image capturing.

12. An image capturing apparatus comprising:
an image capturing unit configured to capture an image of a subject;
an acquisition unit configured to acquire lens information;
a display unit including a display surface configured to display the image, and rotatably supported with respect to the image capturing unit;
a detection unit configured to detect a rotation angle of the display unit; and
a display control unit configured to change a display direction of the image if the rotation angle detected by the detection unit is a predetermined rotation angle or more, wherein, in a case where the lens information includes a predetermined condition, the display control unit performs control such that a display direction of the image is not changed even if the rotation angle is the predetermined rotation angle or more.

13. The image capturing apparatus according to claim 12, wherein the predetermined condition includes a focal length of the lens, the focal length being a predetermined length or more.

14. The image capturing apparatus according to claim 12, wherein, if the display surface is oriented toward the subject, the control unit sets an image capturing parameter for self-image capturing.

15. The image capturing apparatus according to claim 12, wherein, if the display surface is oriented toward the subject, the control unit inverts the image at least in a left and right direction to display the image on the display surface.

16. An image capturing apparatus comprising:
- an image capturing unit configured to capture an image of a subject via an optical system;
- a display unit including a display surface configured to display the image, and rotatably supported with respect to the image capturing unit;
- a detection unit configured to detect a rotation angle of the display unit;
- an acquisition unit configured to acquire field angle information of the optical system; and
- a control unit configured to control a switch to a self-image capturing mode based on a combination of the rotation angle detected by the detection unit and the field angle information acquired by the acquisition unit.

* * * * *